(12) United States Patent
Virgilio et al.

(10) Patent No.: US 7,907,521 B2
(45) Date of Patent: Mar. 15, 2011

(54) METHOD AND SYSTEM OF ASSIGNING ACCESS CONNECTIONS

(75) Inventors: Angelo Virgilio, Toronto (CA); Benoit Côté, Longueil (CA); Michael B. Haarsma, London (CA); Jeffrey F. Baines, London (CA)

(73) Assignee: BCE Inc., Montreal, Quebec (CA)

(*) Notice: Subject to any disclaimer, the term of this patent is extended or adjusted under 35 U.S.C. 154(b) by 369 days.

(21) Appl. No.: 11/961,122

(22) Filed: Dec. 20, 2007

(65) Prior Publication Data

US 2008/0151748 A1 Jun. 26, 2008

(30) Foreign Application Priority Data

Dec. 29, 2006 (CA) .................................. 2581729

(51) Int. Cl.
*G01R 31/08* (2006.01)
(52) U.S. Cl. .................................................... 370/229
(58) Field of Classification Search .................... None
See application file for complete search history.

(56) References Cited

U.S. PATENT DOCUMENTS

| | | | |
|---|---|---|---|
| 5,991,292 A * | 11/1999 | Focsaneanu et al. | 370/352 |
| 6,414,635 B1 * | 7/2002 | Stewart et al. | 342/457 |
| 6,467,090 B1 * | 10/2002 | Brodigan | 725/87 |
| 2002/0002500 A1 * | 1/2002 | Takahashi | 705/26 |
| 2006/0056293 A1 | 3/2006 | Kumagai et al. | |
| 2008/0151748 A1 * | 6/2008 | Virgilio et al. | 370/229 |

* cited by examiner

*Primary Examiner* — Robert W Wilson
(74) *Attorney, Agent, or Firm* — Leslie A. Kinsman; Borden Ladner Gervais LLP (57) ABSTRACT

A method and system for load balancing network access solutions, for example Provider Edger (PE) routers and network interface cards within said routers, based on characteristics of the destination device to which the assigned network access solutions connect. This enables a service provider to load balance access connections of a particular customer across a number of different network access solutions, based on who the customer is and where the customer is located. In addition, such a system can balance network access solutions based on capacity and utilization of the network access solutions.

29 Claims, 3 Drawing Sheets

METHOD AND SYSTEM OF ASSIGNING ACCESS CONNECTIONS

FIELD OF THE INVENTION

The present invention relates generally to service providers who provide networking services to customers. More particularly, the present invention relates to assigning network access solutions for connections to specific devices.

BACKGROUND OF THE INVENTION

Service provider (SP) networks typically provide networking services to customers via provider edge (PE) routers, which connect to Customer Edge (CE) devices, e.g., CE routers. Typically a service provider will have a plurality of PE routers, each of which includes a plurality of router network interface cards (NIC) which include ports that provide connectivity to the CE routers. Enterprise customers are able to connect to different services (e.g., Internet, IP-VPN, MPLS, ATM, etc.) through these ports on the PE routers.

Factors that affect such connections include the distance between the PE and the CE routers, the type of connection and bandwidth associated with it, the type of service being provided, and capacity.

When an order for a new customer connection is placed, the SP needs to assign a NIC on a PE router to the connection. The simplest assignment technique is to assign all compatible connections to a NIC until it is at maximum capacity, and then start assigning further connections to the next NIC, etc.

However, this is not a very efficient technique as this leads to under utilization of some NIC and excess loads on others. Another problem with such a technique is that it may cause a potential single point of failure for a group of customer connections. This is particularly problematic when a customer adds a series of connections at once, for example when a new CE router is being implemented. In this case, all of the connections from a CE can lead to a single PE router, or even to a single NIC. If a particular enterprise customer has all of their sites connected to a single NIC and that NIC fails, then all of the customer's connections will be affected. If the customer is using VoIP (voice over internet protocol) for its telephone calls, then such a NIC failure can lead to a customer losing all communication capability.

It is known to load balance by assigning connections to underutilized NIC. For example, various prior art tools can load balance by assigning the currently least utilized NIC for each new order in order to balance the load on each NIC. In a traditional load balancing approach to assigning PE router NICs, the NICs are assigned based on NIC utilization. This does not take into account who the customer is and whether or not the customer has other ports or NICs assigned to him either at the same or another location.

However load balancing based solely on the current utilization of NICs does not remove the potential for a single point of failure for a group of customer connections. Accordingly, there is a need for an improved tool which reduces the likelihood of a single point of failure for a group of customer connections. Furthermore, with developments in voice-over-IP and data technologies, more and more of customer traffic will traverse data networks. Accordingly, service providers will need to ensure that customer's access connections are stable. Accordingly, there is a need for an inventory and assignment tool which properly manages and load balances access connections for enterprise customers, and in particular multi-site customers.

SUMMARY OF THE INVENTION

It is an object of the present invention to obviate or mitigate at least one disadvantage of previous assignment techniques.

Generally, embodiments of the present invention provide a method and system for load balancing network access solutions, for example Provider Edger (PE) routers and network interface cards within said routers. The method and systems described herein assign network access solutions based on characteristics of the destination device to which the assigned network access solutions connect. Embodiments of the invention, in addition, balance network access solutions based on capacity and utilization of the network access solutions.

An aspect of the present invention is directed to an inventory and assignment tool which tracks which NICs on which routers are used for customer connections.

In a first aspect, the present invention provides a system that enables NIC assignment to a particular customer based on (a) information representing available network access solutions; and (b) information representing network access solutions already assigned to the particular customer. An embodiment of the invention identifies customer characteristics (for example, customer identity or the geographic location of the CE device), in order to diversify network access solutions based on the customer characteristics in order to reduce the potential for a single point of failure. In addition, embodiments of the invention also load balance based on utilization of network access solutions. A service provider can then load balance access connections of a particular customer across a number of different network access solutions, based on who the customer is and where the customer is located.

An embodiment of the invention assigns a network access solution to a CE device which balances equalizing the network utilization across the potential network access solutions with minimizing the number of CE devices with a particular characteristic (e.g. customer name and/or location) connected to each of said potential network access solutions. Network access solutions (NAS) includes the Network access devices which provide connectivity to customer edge networking equipment. This term includes PE routers, and the network interface cards housed therein. Depending on the embodiment, load balancing and/or diversification of network access solutions can occur at the PE router level and/or at the Network Interface card level.

According to an embodiment of the invention, customer thresholds are used to ensure that only a maximum number of customer sites are connected to a single network access solution. Such thresholds can be used to determine how to trade off load balancing based on port utilization and capacity with a diversification of each customer's access connections.

A further embodiment of the invention can balance access connections based on a customer's specific requirements. For example, some customers will require redundant access connections to more than one PE router, in order to ensure connectivity.

According to one aspect of the invention, there is provided a method of assigning a network access solution to satisfy a communication request to connect to a customer device comprising: a) evaluating a characteristic of said customer device; b) determining potential network access solutions to satisfy the request; c) determining which of the potential network access solutions have the least number of connections to a customer device with said characteristic; and d) assigning a network access solution with the least number of connections to a customer device with said characteristic to satisfy said request.

In a further aspect, there is provided a method of assigning a network access solution to satisfy a connection request to a Customer Edge (CE) device comprising: a) evaluating a characteristic of said CE device; b) determining potential network access solutions to satisfy the request; c) determining the number of CE devices with said characteristic which are already connected to each of said potential network access solutions; d) determining the network utilization of each of said potential network access solutions; and e) assigning a network access solution to said CE device which balances equalizing the network utilization across the potential network access solutions with minimizing the number of CE devices with said characteristic connected to each of said potential network access solutions.

In a further aspect, the present invention provides a method of assigning a Provider Edge (PE) port to satisfy a communication request to connect to a Customer Edge (CE) port comprising: a) evaluating a characteristic of said CE port; b) determining potential PE routers to satisfy the request; c) determining which of the potential PE routers have the least number of connections to a CE port with said characteristic; and d) assigning a PE port from the PE with the least number of connections to a CE port with said characteristic to satisfy said request.

In a further aspect, the present invention provides a system for assigning a network access solution to satisfy a connection request to a Customer Edge (CE) device comprising: a) user interface for receiving a request from a user for a new connection to said CD device; b) a customer rules and assignments database subsystem; c) a network utilization information database subsystem; and d) a decision engine for executing a method of assigning a network access solution comprising: i) evaluating a characteristic of said CE device; ii) determining potential network access solutions to satisfy the request; iii) determining the number of CE devices with said characteristic which are already connected to each of said potential network access solutions; iv) determining the network utilization of each of said potential network access solutions; and v) assigning a network access solution to said CE device which balances equalizing the network utilization across the potential network access solutions with minimizing the number of CE devices with said characteristic connected to each of said potential network access solutions.

In a further aspect, the present invention provides an Inventory and Assignment tool for assigning a network access solution to satisfy a connection request to a Customer Edge (CE) device comprising: a) evaluation means for evaluating a characteristic of said CE device; b) determining means for determining potential network access solutions to satisfy the request; c) determining means for determining the number of CE devices with said characteristic which are already connected to each of said potential network access solutions; d) determining means for determining the network utilization of each of said potential network access solutions; and e) means for assigning a network access solution to said CE device which balances equalizing the network utilization across the potential network access solutions with minimizing the number of CE devices with said characteristic connected to each of said potential network access solutions.

In a further aspect, the present invention provides a computer program product stored in a machine readable medium containing executable instructions which, when executed by a processor, cause said processor to carry out a method of assigning a network access solution to satisfy a connection request to a Customer Edge (CE) device comprising: i) evaluating a characteristic of said CE device; ii) determining potential network access solutions to satisfy the request; iii) determining the number of CE devices with said characteristic which are already connected to each of said potential network access solutions; iv) determining the network utilization of each of said potential network access solutions; and v) assigning a network access solution to said CE device which balances equalizing the network utilization across the potential network access solutions with minimizing the number of CE devices with said characteristic connected to each of said potential network access solutions.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

In the following description, for purposes of explanation, numerous details are set forth in order to provide a thorough understanding of exemplary embodiments of the present invention. However, it should be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

Figure 1:
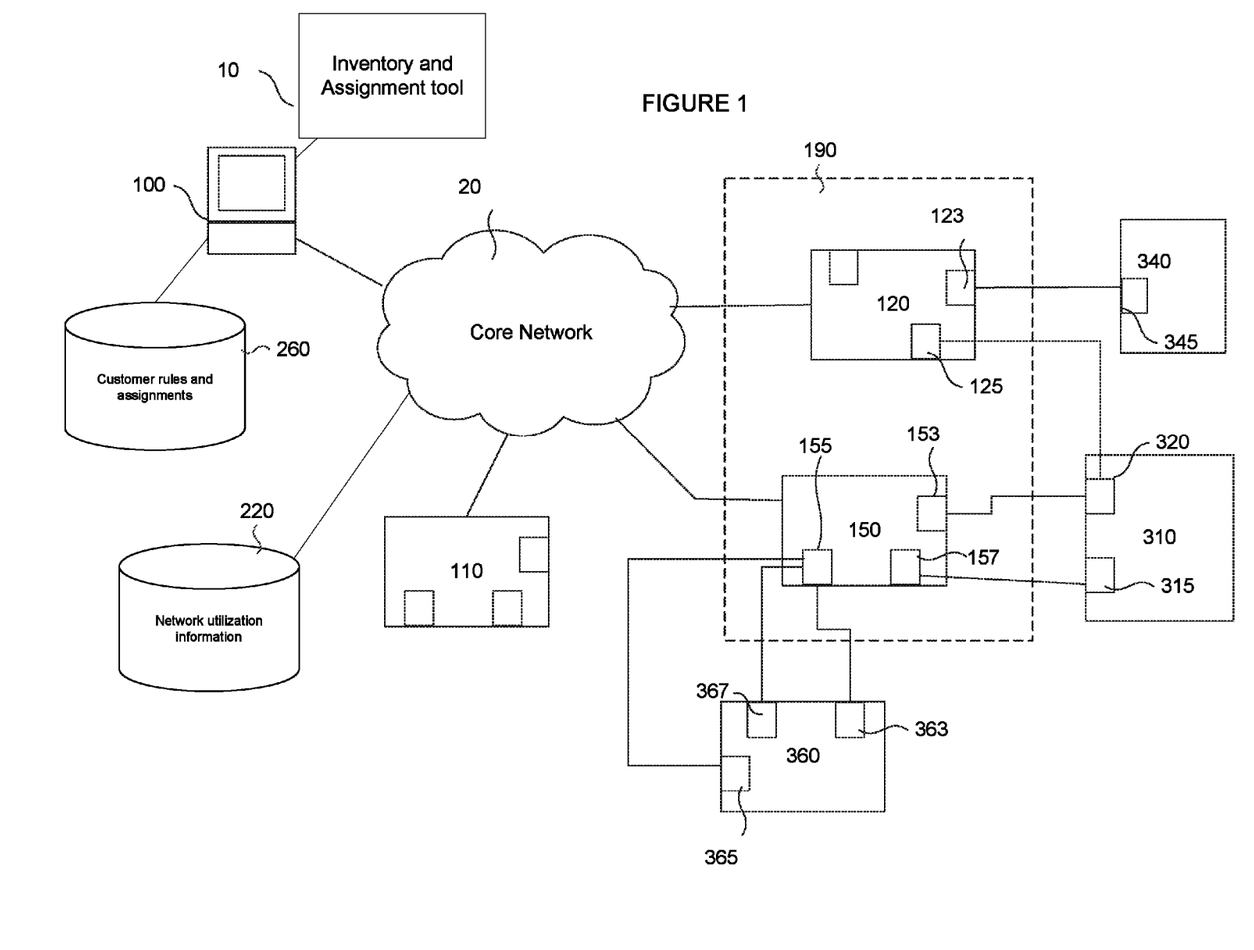
FIG. 1 is a diagram of a system for assigning network access solutions according to a non-limiting embodiment of the present invention.

FIG. 1 is a schematic diagram of a non-limiting exemplary system incorporating an embodiment of the invention. FIG. 1 illustrates a portion of a service provider network providing access solutions to a plurality of customers. In particular, FIG.

1 shows a portion of a service provider network including three network access solution devices, for example, provider edge (PE) routers 110, 120 and 150 coupled to the service provider's core network 20. The type of the core network 20 is not particularly limited and, as such, the core network 20 may comprise an Internet Protocol based network, an ATM network or any other suitable type of an access or a transport network.

In the figure each PE router 120, 150 and 110 comprises a plurality of network interface cards. Each network interface card provides a plurality of ports to provide network access. In the illustration of FIG. 1, PE routers 120 and 150 are co-located, for example, within a central office (CO) 190. For the purposes of the various embodiments of the present invention a network access solution (NAS) may include a given port on a given network interface card, a given network interface card, a given PE router or a combination thereof. In the specific non-limiting example depicted in FIG. 1, the PE router 110 is located at a location different from the central office 190, such as, for example, another central office (not depicted). It should be expressly understood that teachings of various embodiments presented herein can be applied for load balancing within a single central office or across multiple central offices.

Three customer edge (CE) routers 310, 340 and 360 are shown in FIG. 1, which represent a small subset of customers connected to the service provider network. In this example CE router 340 includes a single connection from PE network interface card 123 to CE network interface card 345. CE router 310 is shown to include two network interface cards, namely, CE network interface card 315, which connects to PE network interface card 157 of PE router 150; and CE network interface card 320, which is shown to have two connections. Network interface card 320 connects to PE network interface card 125 of PE 120 and in addition connects to PE network interface card 153 of PE 150. In addition, CE router 360 includes three network interface cards, 365, 367 and 363, each connected to PE network interface card 155 of PE router 150.

It should be noted that each CE router 310, 340, 360 may have a plurality of additional network interface cards with a plurality of other connections not shown. Similarly, each of the PE routers 110, 120, 150 can have a plurality of additional network interface cards (not shown) each connecting with one or more CE routers. Furthermore, each PE network interface card would likely have more connections then shown, and three such cards for each PE are shown for illustrative purposes only. A typical network could have many additional PE and CE routers (not shown).

Also shown coupled to the core network 20 is a server 100, which is used for operations administration and maintenance (OA&M), provisioning, and other uses. In some non-limiting embodiments of the present invention, the server 100 comprises an inventory and assignment tool 10. In an alternative non-limiting embodiment of the present invention, the inventory and assignment tool 10 can reside at a different server (not depicted) or it can be distributed among a plurality of servers (not depicted) residing within or coupled to the core network 20.

The server 100 can be coupled to one or more of the PE routers 110, 120, 150 via the core network 20 or via a respective dedicated point-to-point connection (not depicted). The server 100 and the PE routers 110, 120, 150 can implement a communication protocol for exchanging data there between. Persons skilled in the art will appreciate various examples of such communication protocols, such as, for example, Simple Network Management Protocol (SNMP).

A network utilization information database system 220 is also shown connected to the Core Network 20. In some embodiments of the present invention, the network utilization information data base system 220 is operable to collect performance data associated with one or more of the PE routers 110, 120, 150, for example by exchanging SNMP queries. In an alternative non-limiting embodiment of the present invention, the network utilization information data base system 220 may interact with one or more SNMP pollers (not depicted), located within or coupled to the core network 20, which are responsible for collecting performance data associated with the PE routers 110, 120, 150. The performance data includes, but is not limited to, utilization parameters. In some embodiments, the server 100 can have a direct connection (not shown) to the network utilization information database system 220. Alternatively, the network utilization information database system 220 may be integrated with the inventory and assignment tool 10. In yet further non-limiting embodiments of the present invention, the network utilization information database system 220 can be integrated with another component of the server 100.

The embodiment of FIG. 1 also shows coupled to the server 100, a customer rules and assignments data base system 260 which stores information regarding current customer network access solutions assignments, as well as additional customer requirements which govern the assignment of network access solutions. In alternative embodiments, the customer rules and assignments data base system 260 can be coupled to the core network 20, either directly or via an intermediate network element, or alternatively can reside within another network element. In such embodiments, the server 100 may or may not have a direct connection to the customer rules and assignments data base system 260. Alternatively, the customer rules and assignments data base system 260 may be integrated with the inventory and assignment tool 10.

FIG. 1 illustrates several non-limiting scenarios as to how network access solutions can be arranged between a given service provider (i.e. a service provider associated with one or more of the PE routers 110, 120, 150) and a given customer (such as a customer associated with one or more of the CE routers 310, 340, 360). In the specific non-limiting example depicted in FIG. 1, CE router 360 only includes three access connections, all to PE network interface card 155. Thus, in this example, if there are no additional connections, PE network interface card 155 represents a single potential point of failure for all connections for CE router 360. Thus, all network access for CE router 360 will fail if PE network interface card 155 or PE router 150 should fail. Furthermore, as shown, PE network interface card 155 has triple the load of PE network interface cards 153 and 157, each of which only has a single connection. Thus, PE network interface card 155 is over utilized in comparison to all the other PE network interface cards shown in this example. Embodiments of the invention are directed to addressing both of these situations.

In addition, FIG. 1 illustrates CE network interface card 320 having connections to both PE network interface card 125 on PE router 120 and to PE interface card 153 on PE router 150. It should be noted that this may represent two separate connections, representing two separate services or access paths for additional bandwidth. However, this may also represent a redundant connection with the same service capable of being carried by either connection for redundancy purposes.

Figure 2:
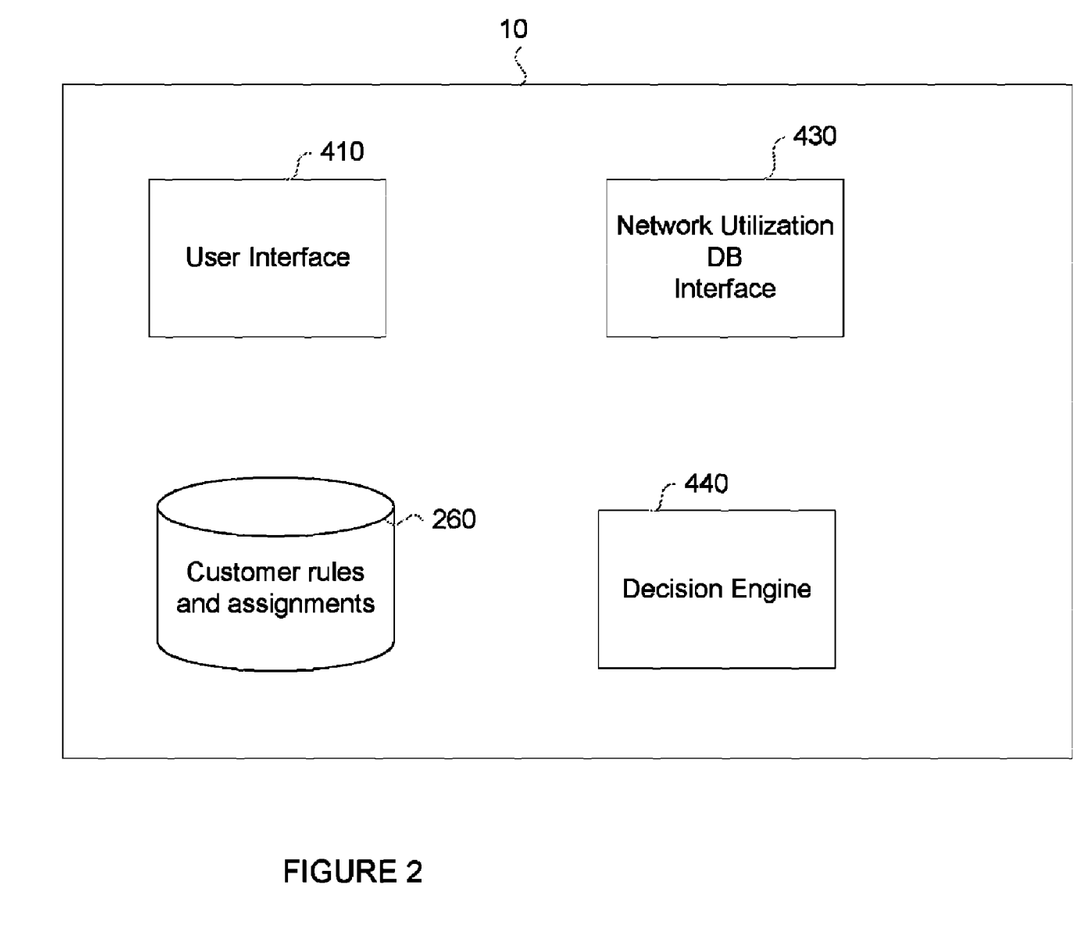
FIG. 2 is a block diagram illustrating a non-limiting embodiment of an inventory and assignment tool of the system of FIG. 1.

FIG. 2 is a block diagram illustrating the components of an inventory and assignment tool 10 according to an embodiment of the invention. It should be appreciated that an embodiment of the invention can comprise a computer program product storing computer executable instructions which when executed by a processor, establishes the following blocks for carrying out the methods described herein. It should be appreciated that an alternative embodiment comprises a combination of hardware and software, which may be distributed, for carrying out the methods described herein. As shown, the inventory and assignment tool 10 includes a user interface 410, for example a Graphical User Interface (GUI), for interacting with a user. This allows the user to enter a request for a new network access solution. GUI 410 can also be used to return the assigned network access solution to the user or, alternatively, depending on the embodiment, the GUI 410 can provide a set of assignable network excess solutions for the user to select from.

The inventory and assignment tool 10 can further comprise the customer rules and assignments data base system 260 as well as a network utilization information database system block 430 for interfacing with the network utilization information database system 220. It should be appreciated that as an alternative the inventory and assignment tool 10 can itself include the network utilization information database system 220, if it is not otherwise implemented as an external system. Similarly, the customer rules and assignments data base system 260 can be implemented as an external system, in which case the inventory and assignment tool 10 can include an interface (not depicted) for communicating with the customer rules and assignments data base system 260. Also shown is a decision engine 440 for executing various steps of the method, as discussed below with reference to FIG. 3.

Figure 3:
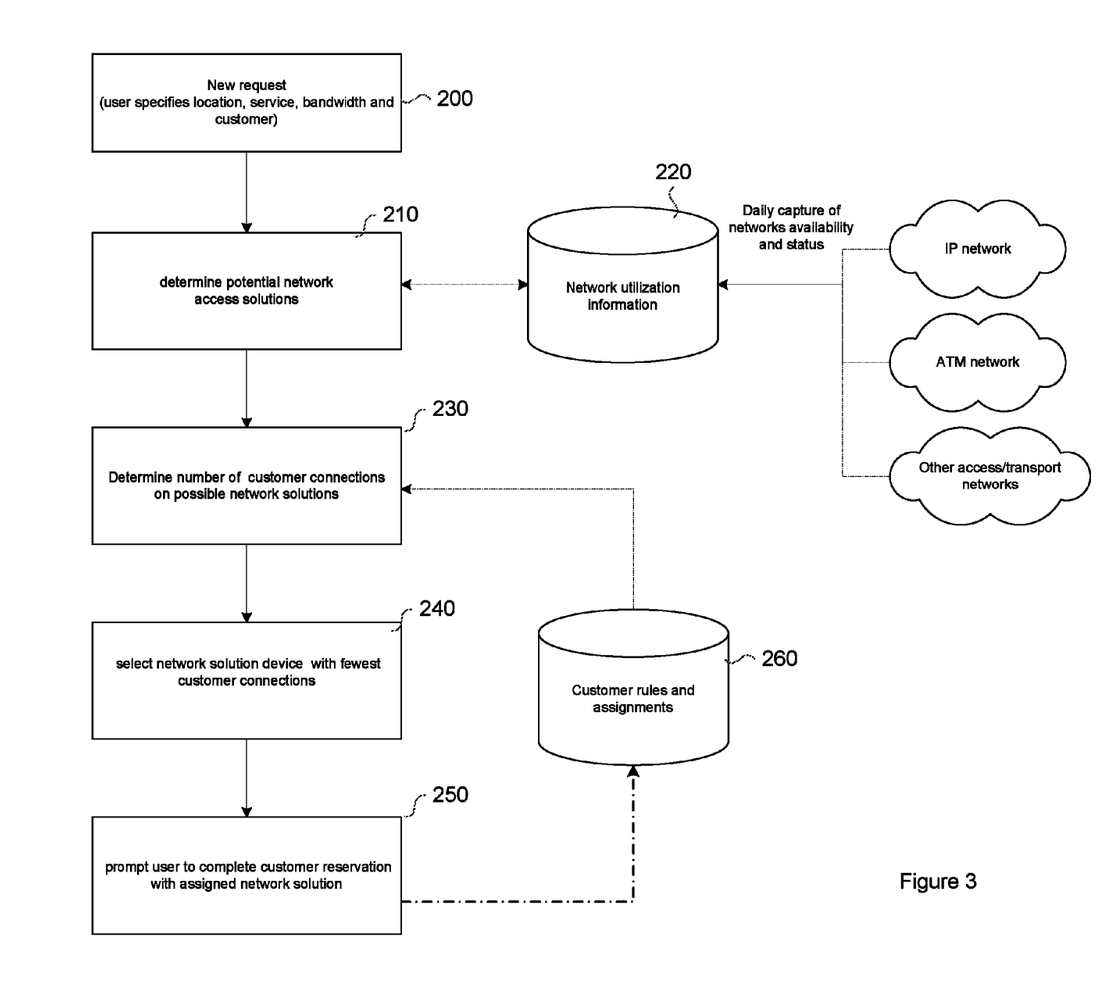
FIG. 3 is a flow chart illustrating a method of assigning network access solutions according to a non-limiting embodiment of the present invention.

We now discuss FIG. 3, which is a flow chart which illustrates a non-limiting embodiment of a method for assigning network solutions to a user request. The method for assigning network solutions can be conveniently executed by the inventory and assignment tool 10.

First, a user request is received at step 200 by the inventory and assignment tool 10 from a user. The user can be a service provider operator of the system 100, who accesses the inventory and assignment tool 10 when she or he needs to execute a network access solution assignment process associated with a particular customer. In an alternative non-limiting embodiment, particularly applicable where the inventory and assignment tool 10 allows the customer to execute a self-service process, the user can be the customer who accesses the inventory and assignment tool 10 when executing such a self-service process.

In some embodiments of the present invention, the inventory and assignment tool 10 can receive the user request which is submitted via a web page using the user interface 410. However, in alternative non-limiting embodiments of the present invention, the user request can be received by other means, such as, but not limited to, by interacting with an Interactive Voice Response system (not depicted), by transmitting an e-mail, etc. The user request provides information required by the inventory and assignment tool 10 in order to process the user request. In some embodiments of the present invention, the user request comprises an indication of the customer's identity, an indication of the customer's location (ex. a location of the CE router associated with the customer) or a combination thereof. In some embodiments of the present invention, the indication of the customer's identity may comprise a Virtual Route Forwarding (VRF) identifier known to those of skill in the art. However, it should be expressly understood that the type of the identifier used is not particularly limited and other alternatives will become apparent to those of skill in the art.

In some embodiments of the present invention, the user request may comprise additional information. Some examples of the additional information include, but are not limited to, a type of services being request, the required bandwidth, an indication of customer specific rules, etc. Naturally, the user request may comprise a plethora of additional information, which in some embodiments of the present invention, can be used a secondary decision criteria, as will be discussed in greater detail herein below.

The inventory and assignment tool 10 then determines potential network access solutions to satisfy the request at step 210. Potential network access solutions can include PE routers and PE network interface cards within the PE routers. The inventory and assignment tool 10 first determines which of the available network access solutions are "reachable" to the specific customer in question. Generally speaking, the inventory and assignment tool 10 determines if a given network access solution (ex. a given PE router or a given PE network interface card) is reachable based on technical characteristics of the given network access solution. In some embodiments of the present invention, the inventory and assignment tool 10 determines if a particular NAS is reachable based on proximity of the particular NAS to the customer. In other non-limiting embodiments, the determination can be further based on an indication of the type of services and/or bandwidth which was received as part of the user request in step 200. For example, the inventory and assignment tool 10 can consider whether the particular NAS is configured to deliver the service being requested or the bandwidth being requested.

In some non-limiting embodiments of the present invention, a given service provider may have provisioned the inventory and assignment tool 10 with one or more business rules that govern what network access solutions are deemed to be reachable. As one non-limiting example of such a business rule, it may be beneficial to utilize a first type of PE router before utilizing a second type of PE router. For example, the first type of routers may be more robust, and/or have better inherent redundancy capabilities, etc. Alternatively, the service provider may prefer to allocate the first type of routers to customers which pay for a premium service when possible. Thus embodiments of the invention can consider the network availability and current utilization of particular network access solutions at potential locations, the access/transport technologies available at potential locations to satisfy the request, and business guidelines (e.g. operator or customer preferences for using particular access and transport technologies).

The network utilization is provided by the aforementioned network utilization information database system 220. It will be recalled that in some embodiments of the present invention, the network utilization information database system 220 collects and stores performance data from the PE devices. In this non-limiting embodiment, the inventory and assignment tool 10 uses the data stored in the network utilization information database system 220 to qualify potential NAS which are eligible to accept new customer connections, based on determined thresholds. As a non-limiting illustration, consider the following scenario. Let it be assumed that the inventory and assignment tool 10 identifies three reachable PE devices (for example, PE devices similar to the PE routers 110, 120, 150) located within a serving area which can satisfy a user request for a specific customer. If these PE devices have a utilization of 30%, 40% and 85% respectively, only the first two devices would be selected as potential network access solutions to satisfy the request, based on minimum load balancing thresholds.

The inventory and assignment tool 10 then determines at step 230 the number of active and reserved connections for the specified customer on each PE router and on each PE interface card selected as a possible network access solution during the previous step 210. In some non-limiting embodiment of the present invention, the inventory and assignment tool 10 accesses the aforementioned customer rules and assignment system 260 to determine the number of active and reserved connections for the specific customer. In those embodiments of the present invention where VRFs are used to identify customers, the look up of the customer rules and assignment database system 260 can be based on a given VRF associated with a given customer. In some embodiments, these network access solutions are also verified against customer rules that limit the number of active connections for the customer on PE routers, or possibly on the PE network interface cards themselves. These rules are stored in the customer rules and assignments data base system 260, and are used to assign the network access solutions appropriately.

The inventory and assignment tool 10 then selects a NAS with the fewest connections to the customer assignment at step 240.

Depending on the embodiment, this can be determined on a PE router basis, a NIC basis, or both. In a first example based solely on a PE router basis, let us assume that a service provider receives a new order for XYZ Inc. This will lead to a user requesting a NAS reservation. The inventory and assignment tool 10 will determine a list of reachable PE routers and will select from this list a PE router with the least number of connections for this customer. For example, let us assume the list of reachable routers includes 2 PE routers, and the first PE router already has three existing connections for XYZ Inc., whereas the second PE router has two existing connections for XYZ Inc. In this example, the second PE router has the fewest existing connections to XYZ, so it is selected in order to balance the connections for XYZ Inc.

According to an embodiment of the invention, in cases where more than one network access solution has the least number of connections, the inventory and assignment tool 10 uses a second criteria to assign a particular network access solution of the more than one network access solutions. In one example, the inventory and assignment tool 10 in this case selects a NIC with the least number of connections to the customer. For example, if there are two or more reachable PE routers each having the same least number of existing connections with XYZ inc., the inventory assignment tool 10 assigns a NIC from one of these PE routers that has the fewest connections to the customer.

In an alternative embodiment, the system simply chooses a reachable NIC with the least number of connections, regardless of whether the PE router which houses said NIC has the least number of connections of reachable PE routers. This is also useful in cases where there is only a single reachable PE router. For example, referring to FIG. 1, assume the customer associated with CE router 360 requires an additional connection. Assume that PE router 150 is the only potential PE router capable of accommodating the additional connection. The system will then choose one of cards 153 or 157, as card 155 already has 3 connections to CE router 360, and neither of cards 153 or 157 has an existing connection to CE router 360. Of course, if PE router 110 was reachable, then any of its cards would be selected, as PE router 110 has no current connections to CE router 360.

Once a NAS is selected, the inventory and assignment tool 10 then, at step 250, returns the assignment to the user via interface 410, who then completes the customer reservation in the system. This assignment information is then stored in the customer rules and assignments database 260 so that the inventory and assignment tool 10 is aware of which NICs are assigned to each customer location.

In the event that more than one NIC has the fewest customer connections, the system can select a NIC from these NIC according to secondary consideration. One example of a secondary consideration is to select the NIC with the lowest utilization according to traditional load balancing techniques.

As an alternative to assigning a selected NIC, the inventory and assignment tool 10 can provide the user with an ordered list of potential NICs, and allow the user to select a particular NIC based on other criteria. Alternatively, the inventory and assignment tool 10 can recommend a particular NIC and provide an ordered list of other potential NICs, and let the user decide whether to accept the particular NIC or to select another NIC from the ordered list.

Note above description assumes the priority is customer diversification rather than load balancing based on network utilization of network interface cards. Note that in some embodiments, as described above, selecting potential network access solutions can include a degree of load balancing based on network utilization by qualifying reachable network solutions based on utilization. An alternate embodiment can use conventional load balancing techniques to balance network utilization across all of the potential network interface cards, subject to some maximum threshold of connections which are allowed to any particular CE device. For example, in another embodiment, rather than limit the choice of assigned network access solutions to those with the fewest connections to a customer, the inventory and assignment tool 10 can select several potential network access solutions, which are each below a threshold of maximum customer connections. Secondary considerations are then used to select from these potential network access solutions. Thus, such an embodiment can more flexibly balance equalizing the network utilization across the potential network access solutions with minimizing the number of CE devices with said characteristic connected to each of said potential network access solutions. The thresholds are usually established on a per-customer basis. For example, a particular customer can provide rules which dictate the maximum threshold of connections on a given NIC and/or a maximum threshold of connections on a given PE router.

In some embodiments of the present invention, the inventory and assignment tool 10 can use a mechanism for identifying the customer. According to an embodiment of the invention, the mechanism employed by the inventory and assignment tool 10 is based on a table of Virtual route forwarding (VRF) identifiers, which identifies the IP subnet address for each customer. This VRF table can be included in the customer rules and assignments data base system 260, or it can constitute a separate database. In alternative embodiments of the present invention, other suitable mechanisms for identifying the customer can be used. Some examples of the other suitable mechanisms include, but are not limited to, a customer identifier, a MAC address of the CE router associated with the customer, etc.

In a further embodiment, the system can accommodate customer requirements for redundant connections. Some customers, due to the nature of the applications they are using and the necessity for uninterrupted communication, will require each of their requested connections be supported by more then one PE interface card, typically on different PEs. This can involve each CE connection linked to more than one PE interface card, possibly on different PE routers. An example of this is discussed above with reference to two connections from CE interface card 320. In some cases, a customer may have redundant CE devices at each location, with each being connected to different PE ports, possibly on different PE routers. Some applications may be so crucial, that the customer insists the different PE routers not be co-located (e.g., be located at different central office locations). For example, a customer site may have a "primary" central office serving its location. However, some customers may desire diversification of their connections across different PE routers in different COs. Considerations for doing this can include, sensitivity of data transmitted (where such diversification makes it harder for transmissions to be intercepted), redundancy, etc. A service provider may charge a premium for offering this diversification feature. Embodiments of this invention can be applied for example in the following manner: (i) primary condition—load balance within a single CO, (ii) secondary condition—load balance between different COs or different PE router locations.

It should be noted that in this situation, as the customer already has redundant connections, the service provider may choose to prioritize assigning network access solutions which maximize network utilization, provided such assignments satisfy minimum customer requirements.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of assigning a network access solution to satisfy a connection request to a Customer Edge (CE) device comprising:
   a) evaluating a characteristic of said CE device;
   b) determining potential network access solutions to satisfy the request;
   c) determining the number of CE devices with said characteristic which are already connected to each of said potential network access solutions;
   d) determining the network utilization of each of said potential network access solutions, including receiving information from a database, said database updated on a regular basis with network availability and status information; and
   e) assigning a network access solution to said CE device which balances equalizing the network utilization across the potential network access solutions with minimizing the number of CE devices with said characteristic connected to each of said potential network access solutions.

2. The method as claimed in claim 1 wherein said characteristic comprises at least one of (i) an identity of the customer associated with said customer device and (ii) a location of the customer device.

3. The method as claimed in claim 1 wherein said characteristic comprises technical characteristics of said CE device.

4. The method as claimed in claim 1, wherein said determining the number of CE devices with said characteristic which are already connected to each of said potential network access solutions comprises receiving information from a database which stores data pertaining to customer allocation of network access solutions.

5. The method as claimed in claim 1, wherein assigning a network access solution to said CE device which balances equalizing the network utilization across the potential network access solutions with minimizing the number of CE devices with said characteristic connected to each of said potential network access solutions comprises: determining which of the potential network access solutions have the least number of connections to a CE device with said characteristic; and
   a) in the event there is a single network access solution with said least number, assigning said network access solutions to satisfy the request; and
   b) in the event there is a plurality of network access solutions with said least number, assigning a network access solution from said plurality of network access solutions based on a criteria.

6. The method as claimed in claim 5 wherein said criteria comprises assigning the network access solution with the lowest network utilization of said plurality of network access solutions.

7. The method as claimed in claim 5 wherein determining which of the potential network access solutions have the least number of connections to a CE device with said characteristic comprises determining which Provider Edge router has said least number of connections and wherein said criteria comprises, assigning a network interface card with the least number of connections to said CE device with said characteristic.

8. The method as claimed in claim 1, wherein assigning a network access solution to said CE device which balances equalizing the network utilization across the potential network access solutions with minimizing the number of CE devices with said characteristic connected to each of said potential network access solutions comprises selecting potential network access solutions which have a network utilization below a first threshold and a number of CE devices with said characteristic which are already connected to said potential network access solutions below a second threshold.

9. The method as claimed in claim 1 further comprising, in the event a characteristic of said CE device is a customer requirement for redundant connections between each CE device and a plurality of network access solutions, assigning at least one additional network access solution to satisfy said request.

10. The method as claimed in claim 9 wherein assigning at least one additional network access solution to satisfy said request comprises selecting said additional network access solution from a different PE router than a PE router containing the assigned network access solution.

11. The method as claimed in claim 10, wherein the PE router containing the assigned network access solution and said different PE router are not co-located.

12. The method as claimed in claim 9 wherein assigning a network access solution to said CE device which balances equalizing the network utilization across the potential network access solutions with minimizing the number of CE devices with said characteristic connected to each of said potential network access solutions further comprises selecting said assigned network access solution and said additional network access solution so as to maximize network utilization.

13. The method as claimed in claim 9 wherein assigning a network access solution to said CE device which balances equalizing the network utilization across the potential network access solutions with minimizing the number of CE devices with said characteristic connected to each of said potential network access solutions further comprises selecting said assigned network access solution and said additional network access solution so as to maximize network utilization provided the number of CE devices with said characteristic which are already connected to each of said assigned network access solution and said at least one additional network access solution does not exceed a threshold.

14. The method as claimed in claim 1, wherein determining potential network access solutions to satisfy the request comprises determining potential Provider Edge routers to satisfy the request, and wherein assigning a network access solution to said CE device which balances equalizing the network utilization across the potential network access solutions with minimizing the number of CE devices with said characteristic connected to each of said potential network access solutions comprises assigning a network interface card from one of said potential Provider Edge routers.

15. An Inventory and Assignment tool for assigning a network access solution to satisfy a connection request to a Customer Edge (CE) device comprising:
a customer rules and assignments database;
a server interacting with the customer rules and assignments database, to cause a processor in the server to execute steps of:
evaluating a characteristic of said CE device;
determining potential network access solutions to satisfy the request;
determining the number of CE devices with said characteristic which are already connected to each of said potential network access solutions;
determining the network utilization of each of said potential network access solutions, including receiving information from a database, said database updated on a regular basis with network availability and status information; and
assigning a network access solution to said CE device which balances equalizing the network utilization across the potential network access solutions with minimizing the number of CE devices with said characteristic connected to each of said potential network access solutions.

16. The Inventory and Assignment tool as claimed in claim 15 wherein said characteristic comprises at least one of (i) an identity of the customer associated with said customer device and (ii) a location of the customer device.

17. The Inventory and Assignment tool as claimed in claim 15 wherein said characteristic comprises a technical characteristic of the CE device.

18. The Inventory and Assignment tool as claimed in claim 15, wherein determining the number of CE devices with said characteristic which are already connected to each of said potential network access solutions comprises receiving information from a database which stores data pertaining to customer allocation of network access solutions.

19. The Inventory and Assignment tool as claimed in claim 15, wherein assigning a network access solution to said CE device which balances equalizing the network utilization across the potential network access solutions with minimizing the number of CE devices with said characteristic connected to each of said potential network access solutions comprises steps of:
determining which of the potential network access solutions have the least number of connections to a CE device with said characteristic; and
in the event there is a single network access solution with said least number, assigning said network access solutions to satisfy the request; and
in the event there is a plurality of network access solutions with said least number, assigning a network access solution from said plurality of network access solutions based on a criteria.

20. The Inventory and Assignment tool as claimed in claim 19 wherein said criteria comprises assigning the network access solution with the lowest network utilization of said plurality of network access solutions.

21. The Inventory and Assignment tool as claimed in claim 19 wherein said determining which of the potential network access solutions have the least number of connections to a CE device with said characteristic comprises determining which Provider Edge router has said least number of connections and wherein said criteria comprises, assigning a network interface card with the least number of connections to said CE device with said characteristic.

22. The Inventory and Assignment tool as claimed in claim 15, wherein assigning a network access solution to said CE device which balances equalizing the network utilization across the potential network access solutions with minimizing the number of CE devices with said characteristic connected to each of said potential network access solutions comprises selecting potential network access solutions which have a network utilization below a first threshold and a number of CE devices with said characteristic which are already connected to said potential network access solutions below a second threshold.

23. The Inventory and Assignment tool as claimed in claim 15, further comprising assigning at least one additional network access solution to satisfy said request in the event a characteristic of said CE device is a customer requirement for redundant connections between each CE device and a plurality of network access solutions.

24. The Inventory and Assignment tool as claimed in claim 23 wherein assigning at least one additional network access solution to satisfy said request comprises selecting said additional network access solution from a different PE router than a PE router containing the assigned network access solution.

25. The Inventory and Assignment tool as claimed in claim 24, wherein the PE router containing the assigned network access solution and said different PE router are not co-located.

26. The Inventory and Assignment tool as claimed in claim 23 wherein assigning a network access solution to said CE device which balances equalizing the network utilization across the potential network access solutions with minimizing the number of CE devices with said characteristic connected to each of said potential network access solutions further comprises selecting said assigned network access solution and said additional network access solution so as to maximize network utilization.

27. The Inventory and Assignment tool as claimed in claim 23 wherein assigning a network access solution to said CE device which balances equalizing the network utilization across the potential network access solutions with minimizing the number of CE devices with said characteristic connected to each of said potential network access solutions further comprises selecting said assigned network access solution and said additional network access solution so as to maximize network utilization provided the number of CE devices with said characteristic which are already connected to each of said assigned network access solution and said network access solution does not exceed a threshold.

28. The Inventory and Assignment tool as claimed in claim 15, wherein determining potential network access solutions to satisfy the request comprises determining potential Provider Edge routers to satisfy the request, and wherein assigning a network access solution to said CE device which balances equalizing the network utilization across the potential network access solutions with minimizing the number of CE devices with said characteristic connected to each of said potential network access solutions comprises assigning a network interface card from one of said potential Provider Edge routers.

29. A non-transitory machine readable medium containing executable instructions which, when executed by a processor, cause said processor to carry out assigning a network access solution to satisfy a connection request to a Customer Edge (CE) device comprising steps of:
   i. evaluating a characteristic of said CE device;
   ii. determining potential network access solutions to satisfy the request;
   iii. determining the number of CE devices with said characteristic which are already connected to each of said potential network access solutions, including receiving information from a database, said database updated on a regular basis with network availability and status information;
   iv. determining the network utilization of each of said potential network access solutions; and
   v. assigning a network access solution to said CE device which balances equalizing the network utilization across the potential network access solutions with minimizing the number of CE devices with said characteristic connected to each of said potential network access solutions.

* * * * *